Feb. 3, 1970  F. C. DONOFRIO ET AL  3,493,026
LOCKING MEANS FOR HELICALLY MOVABLE ELEMENTS
Filed July 16, 1968  2 Sheets-Sheet 1

INVENTORS.
FRANK C. DONOFRIO
HOWARD B. HANSELL
FRANCIS V. SABATINO
RICHARD A. STOTLER

Samuel Kane
ATTORNEY

INVENTORS.
FRANK C. DONOFRIO
HOWARD B. HANSELL
FRANCIS V. SABATINO
RICHARD A. STOTLER 3,493,026
LOCKING MEANS FOR HELICALLY MOVABLE ELEMENTS
Frank C. Donofrio, Norristown, Howard B. Hansell, Philadelphia, and Francis V. Sabatino, King of Prussia, Pa., and Richard A. Stotler, Wilmington, Del., assignors to Burroughs Corporation, Detroit, Mich., a corporation of Michigan
Filed July 16, 1968, Ser. No. 745,331
Int. Cl. F16b 39/02, 43/00
U.S. Cl. 151—54                                 3 Claims

ABSTRACT OF THE DISCLOSURE

A threaded bolt is used for driving and securing a computer memory module to the back plane of a computer. A clamp is applied to the bolt to prevent it from backing out of the assembly. A locking device positively locks the clamp to the module and against angular movement relative to the module. The locking device includes a captivating feature to prevent its separation and loss from the clamp.

Background of the invention

This invention relates generally to fastening devices and more particularly to a locking means for preventing movement of a helically movable element from a set position. The invention is similar, in certain respects, to the holding means shown in the U.S. patent to W. W. Usry No. 2,612,911. While not limited thereto, the invention finds special application for locking a threaded bolt which is used for driving and securing a computer memory module to the back plane of a computer, and therefore the invention will be described hereinafter in connection with such use.

Summary of the invention

One of the objects of the present invention is to provide a means for preventing movement of a helically movable member from a set position.

Another object of the invention is the provision of a locking device to keep a bolt or other threaded part from backing out of an assembly.

A further object of the invention is the provision of a locking device to keep a threaded holding member from loosening when subjected to shock and vibration.

A more specific object of the invention is to provide apparatus for assembling and securely locking a modular component in a computer.

Another more specific object of the invention is to provide a locking means for a fast-acting drive member such as a multi-leaded screw which otherwise has a great tendency to loosen when subjected to shock and vibration.

Still another object of the invention is to provide apparatus which is positive in its locking feature, simple to use and inexpensive to manufacture.

In accordance with the above objects and considered first in one of its broader aspects, a locking means in accordance with the invention for preventing movement of a helically movable first element relative to a second element, in which the first element has a multisided head and the second element has an opening for receiving a fastening, may comprise an elongate clamp having near one end a multisided opening shaped so as to fit at least portions of each side of the head of the first element and having near its other end two substantially circularly shaped bores. A fastening is provided which has a circularly shaped portion fitting either of the bores of the clamp and which is to be positioned in the opening of the second element so that its circularly shaped portion will fit into one of the bores of the clamp for positively locking the clamp to the second element and against angular movement.

The invention will be more clearly understood when the following detailed description of the preferred embodiment thereof is read in conjunction with the accompanying drawings which are described below.

Description of the preferred embodiment

Figure 1:
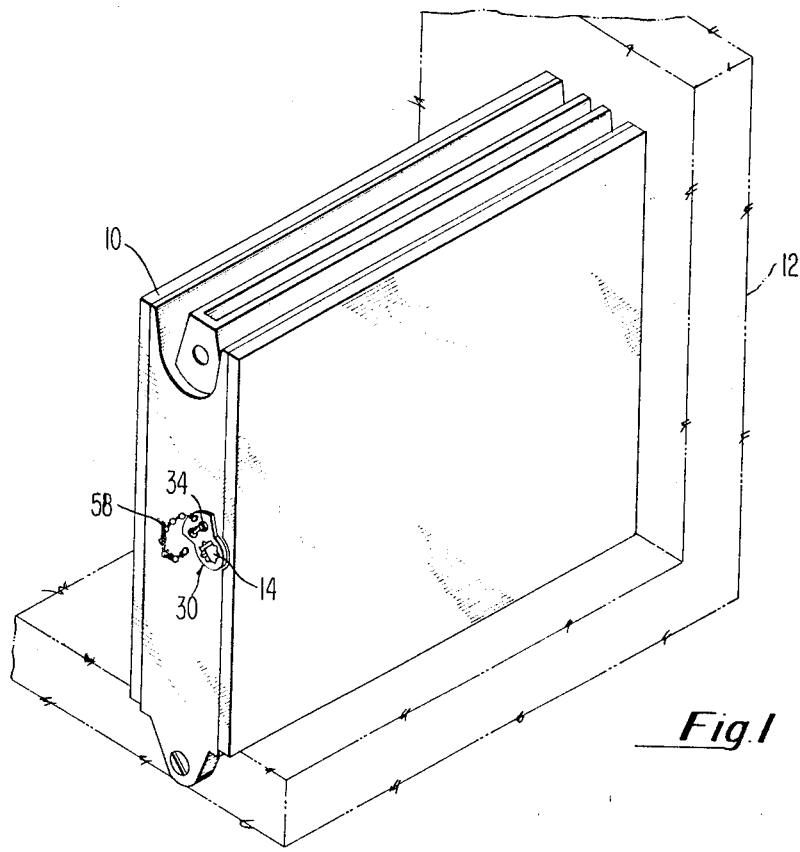
FIGURE 1 is a simplified isometric view of a fragment of computer apparatus embodying the invention.
Figure 3:
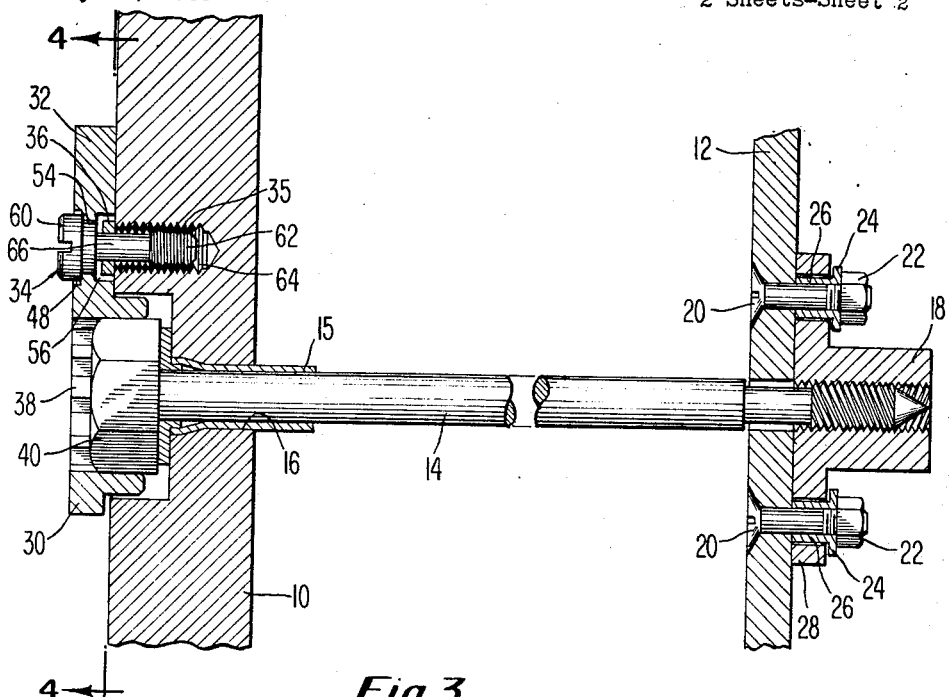
FIGURE 3 is an enlarged sectional side view of a fragment of the apparatus of FIGURE 1.

Referring to the drawings, a computer memory module 10 (FIG. 1) is driven and secured to a computer back plane 12 by means of a helically movable member such as, for example, a bolt 14 (FIG. 3). The bolt 14 passes through a flanged bushing 15 in an opening 16 in the module 10 to engage a threaded component 18 supported by the back plane 12. The component 18 is illustrated in one form as a flanged nut which is secured to the back plane 12 by means of screws 20 and nuts 22 threadedly engaging the screws 20. The nut 18 may be held rigidly to the back plane if desired, however, in the embodiment illustrated it was chosen to be floating relative to the back plane so as to permit the bolt 14 to be oriented and started more readily in the process of threading it into the nut 18. Flanged bushings 24, loosely fitting in openings in the flange 28 of the nut 18 and having their body portions 26 slightly longer than the flange 28, are rigidly held to the back plane 12 by the screws and nuts 20 and 22, while the nut 18 is thus permitted to float slightly relative to the back plane.

In order to keep the bolt 14 from loosening when exposed to certain conditions such as shock or vibration, for example, the present invention locks the bolt in place by means of a clamp assembly 30 so that the bolt cannot loosen or back out of the nut 18. The clamp assembly 30 includes an elongate clamp member 32, a fastening 34 and an annular member 36 which is held captive on the fastening 34.

Figure 2:
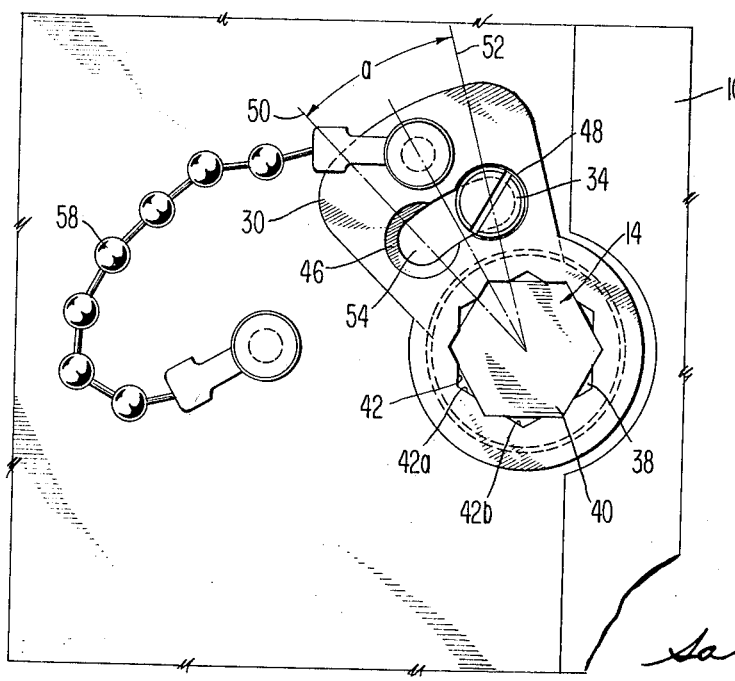
FIGURE 2 is an enlarged front view of a fragment of the apparatus of FIGURE 1.
Figure 4:
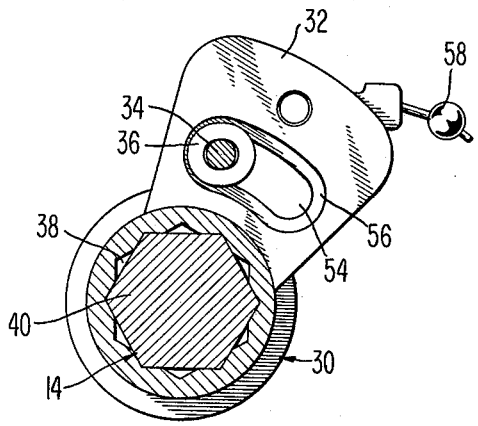
FIGURE 4 is a sectional view taken along line 4—4 of FIGURE 3.

The clamp 32 has a multisided opening 38 (FIGS. 2 and 4) shaped so as to fit over the head 40 of the bolt 14. In order to permit a fine adjustment of the clamp 32, as will appear more clearly hereinafter, the relation of the number of sides on the head 40 is given as follows:

$$m \geq 2,$$
$$n = xm, \text{ and}$$
$$x \geq 2,$$

and in which $m$ is the number of sides of the head 40, $n$ is the number of sides in the opening 38 and $x$ is a factor which is chosen, as desired.

In connection with the relationships set forth above, it is noted that the head 40 of the bolt 14 is in many cases hexagonal, as shown, however the invention is not limited to this shape but is applicable to wrench-engaging heads of other shapes having either more or less than six sides.

In the illustrated embodiment which illustratively utilizes a hexagonal-head bolt 14, the opening 38 has been chosen for purposes of illustration to have 12 sides 42.

ich side 42 includes aligned flats such as 42a and 42b.
  In accordance with the above relationships, in the illustrated embodiment $m=6$, $x=2$, and $n=12$.
  The clamp 32 is provided with two counterbores 46 and 48 (FIGS. 2 and 3), each having its center on one of two radial lines 50 and 52. The angle $a$ in degrees included between the lines 50 and 52 is related to the number of sides $n$ in the opening 38 by the relation $$a=\frac{360}{n}$$

so that with the illustrative 12-sided opening 38, the angle is 30 degrees. In certain applications, the angle $a$ may be greater or less than $360/n$. An arcuate slot 54 (FIGS. 3 and 4) is concentric with the center of the opening 38 and intersects the counterbores 46 and 48. An elongate counterbore 56 (FIG. 4) symmetrical with the arcuate slot 54 is formed in the clamp 32 and provides a pocket for receiving the annular member 36 in the locked assembly (FIG. 3).

An anchoring chain 58 (FIGS. 1 and 2) connected at one end to the clamp 32 and at the other end to the module 10 serves to prevent loss of the clamp assembly 30 whenever it is removed from the bolt 14, or whenever the module 10 is removed from the back plane 12.

The fastening 34 (FIG. 3) is illustrated in the present embodiment as a headed screw comprising a head portion 60 and a threaded end 62 which is received into a threaded hole 64 of the module 10 for tightening the clamp 32 to the module. In certain applications, the screw 34 may be constructed so as to be screwed directly into the threaded hole 64, however, in the illustrated embodiment an insert 35 is provided to increase its holding power. The insert 35 is a helical coil of wire threaded into the hole 64. The screw 34 is screwed into the internal thread of the insert 35.

The screw 34 is provided with an undercut portion 66 which is smaller in diameter than the major diameter of the threaded end 62, and preferably at least as small as, or smaller than, the root diameter of the thread on the threaded end 62. The head 60 of the screw 34 fits either of the counterbores 46 or 48.

Figure 6:
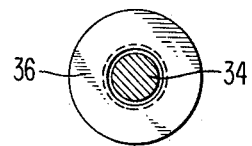
FIGURE 6 shows the annular member before it is deformed.
Figure 5:
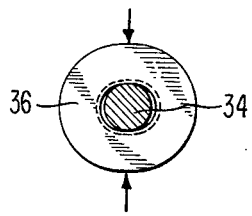
FIGURE 5 illustrates an annular member in a deformed condition.

In the illustrated embodiment, the annular member 36 is initially circular (FIG. 6) and has an internal thread and is threaded on and past the threaded end 62 of the screw 34 after the screw is inserted into the slot 54. After the annular member 36 is thus past the threaded end 62 and is loose on the undercut portion 66, it is deformed in a radial direction as indicated by the arrows in FIG. 5, so that it cannot be threaded off the end 62. This deformation causes the pitch diameter of the internal thread of the annular member 36 to be reduced to a smaller size than the pitch diameter of the threaded end 62. Experience has shown that without deformation the annular member 36, after repeated use, would eventually thread its way off the end 62, resulting in the loss of the screw 34 from the clamp assembly 30. However, by deforming the annular member 36 it is captivated permanently to the screw 34.

In the process of locking the bolt 14 to keep it from loosening, the clamp 32 is applied over the head 40 of the bolt in a position in which one of the counterbores 46 or 48 is coaxial with the threaded hole 64 in the module 10. If this condition is present, the screw 34 is screwed into the insert 35 and tightened to lock the clamp assembly 30 against angular movement relative to the module 10 and back plane 12, and thereby to lock the bolt 14 against helical movement. If it is found, at first, that neither of the counterbores 46 or 48 will align coaxially with the hole 64, then the clamp assembly 30 is removed from the head of the bolt 14 and the bolt then rotated or backed out slightly the required amount until one of the counterbores 46 or 48 is in coaxial alignment with the hole 64. The screw 34 is then inserted and tightened, as described previously, so that its head 60 is in the aligned counterbore.

By means of the present invention, positive locking can be obtained and yet the maximum degree of looseness which could be encountered in loosening the illustrative hexagonal-head bolt 14 to align the clamp 32 is only a small amount, in this case 15 degrees. Accordingly, applicants' invention provides a positive lock in the features of the counterbores 46 and 48 together with the feature of the multisided clamp opening 38 to keep the clamp 32 and bolt 14 from rotating, and provides further a fine adjustment of the clamp 32 attended only by a minimum amount of looseness of the bolt 14. Also, the deformed annular member 36 positively captivates the screw 34 to the clamp 32. As indicated previously the features of the invention are applicable to bolt heads or other wrench-engaging members having more or less than six sides. In an actual construction, the multisided opening 38 was formed to fit over a hexagonal bolt head 40 which measured ½" across flats, and the screw 34 was of miniature size provided with a threaded end 62 whose thread size was #6-32.

While there has been disclosed a specific apparatus to exemplify the principles of the invention, it is to be understood that this is but one form of the invention and that the invention is capable of being constructed and arranged in a variety of shapes, sizes and modifications without departing from its true spirit and scope.

We claim:
1. A locking means for preventing movement of a helically movable first element relative to a second element, said first element having an $m$-sided head, said locking means comprising a said second element having a single opening for receiving a fastening, an elongate clamp having near one end an $n$-sided opening shaped so as to fit at least portions of each side of said head and having near its other end two substantially circularly shaped bores, and a said fastening having a circularly shaped portion fitting either of said bores and to be positioned in said second element opening so that said circularly shaped portion will fit into one of said bores for frictionally and positively locking said clamp to said second element and against angular movement, and wherein,

$$m \geq 2,$$
$$n = xm, \text{ and}$$
$$x \geq 2,$$

and wherein said fastening is a headed screw, said circularly shaped portion is the head of said screw, and said screw further comprises a threaded end engageable with a thread engaging member in said second element opening and a medial body portion between said threaded end and said screw head, and wherein there is an arcuate slot in said clamp concentric with said $n$-sided opening and intersecting said bores, the width of said slot being less than the diameter of said screw head and said slot being dimensioned to freely receive therethrough said threaded end and said medial body portion so as to permit relative movement between said screw and said clamp for moving said screw from one said bore to the other, and wherein the centers of said bores are individually on radial lines extending from the center of said $n$-sided opening, and the angle between said radial lines is $360/n$ degrees.

2. A locking means for preventing movement of a helically movable first element relative to a second element, said first element having an $m$-sided head, said locking means comprising a said second element having a single opening for receiving a fastening, an elongate clamp having near one end an $n$-sided opening shaped so as to fit at least portions of each side of said head and having near its other end two substantially circularly shaped bores, and a said fastening having a circularly shaped portion fitting either of said bores and to be positioned in said second element opening so that said circularly shaped portion will fit into one of said bores for frictionally and positively locking said clamp to said second element and against angular movement, and wherein $m \geq 2$,
$n = xm$, and
$x \geq 2$, and wherein said fastening is a headed screw, said circularly shaped portion is the head of said screw, and said screw further comprises a threaded end engageable with a thread engaging member in said second element opening and a medial body portion between said threaded end and said screw head, and wherein there is an arcuate slot in said clamp concentric with said $n$-sided opening and intersecting said bores, the width of said slot being less than the diameter of said screw head and said slot being dimensioned to freely receive therethrough said threaded end and said medial body portion so as to permit relative movement between said screw and said clamp for moving said screw from one said bore to the other.

3. The combination of a computer back plane, a computer module having a screw thread engaging member, a bolt having an $m$-sided head and applied to secure said module to the back plane, an elongate clamp having near one end an $n$-sided opening fitted on said head and having near its other end two substantially circularly shaped bores and an arcuate slot concentric with said $n$-sided opening and intersecting said bores, the width of said slot being less than the diameter of said bores, a screw for locking the clamp to said module, said screw comprising a screw head substantially fitting either of said bores and having a diameter exceeding the width of said slot, a threaded end engaged in said screw thread engaging member so that said screw head fits into one of said bores and a medial portion between the screw head and said threaded end and freely received through said slot, and a substantially annularly shaped member on said medial portion captivated between the screw head and said threaded end for preventing the screw from being removed from the clamp, and wherein $m \geq 2$,
$n = xm$, and
$x \geq 2$, and wherein the centers of said bores are individually on radial lines extending from the center of said $n$-sided opening, and the angle between said radial lines is $360/n$ degrees.

References Cited

UNITED STATES PATENTS

| 1,229,783 | 6/1917 | Pogue | 151—54 |
| 2,460,613 | 2/1949 | Whelan et al. | 151—69 |
| 2,470,927 | 5/1949 | Hale | 151—69 |
| 2,951,723 | 9/1960 | Bernhard | 151—54 |

FOREIGN PATENTS

| 753,086 | 2/1967 | Great Britain. |

EDWARD C. ALLEN, Primary Examiner

U.S. Cl. X.R.

151—69